(12) United States Patent
Kaneda (10) Patent No.: US 6,658,029 B2
(45) Date of Patent: Dec. 2, 2003

(54) LASER BEAM-GENERATING APPARATUS

(75) Inventor: Yushi Kaneda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/918,730

(22) Filed: Jul. 31, 2001

(65) Prior Publication Data

US 2002/0104971 A1 Aug. 8, 2002

(30) Foreign Application Priority Data

Aug. 9, 2000 (JP) ...................... P2000-241787

(51) Int. Cl.$^7$ .............. H01S 3/10; H01S 3/08
(52) U.S. Cl. ............... 372/21; 372/22; 372/98; 372/99; 372/105
(58) Field of Search ............. 372/21, 22, 23, 372/50, 54, 99, 94, 105

(56) References Cited

U.S. PATENT DOCUMENTS 4,731,787 A * 3/1988 Fan et al. ............. 372/22

* cited by examiner

Primary Examiner—Paul Ip
Assistant Examiner—Armando Rodriguez
(74) Attorney, Agent, or Firm—Sonnenschein, Nath & Rosenthal LLP (57) ABSTRACT

A deep-ultraviolet violet laser beam which is a harmonic and is generated inside a nonlinear optical element (101) is emitted outside the nonlinear optical element (101), being spaced from a green laser beam, which is a fundamental wave. The green laser beam emitted outside the nonlinear optical element (101) is reflected by an input-coupling mirror (102) and applied again into the nonlinear optical element (101) in order to form a closed optical path for the fundamental wave. Also, the deep-ultraviolet laser beam emitted outside the nonlinear optical element (101) is reflected by a reflecting mirror (28) other than the input-coupling mirror (102) in order to emit the deep-ultraviolet laser beam from a deep-ultraviolet laser beam-generating section (20).

4 Claims, 8 Drawing Sheets

LASER BEAM-GENERATING APPARATUS

RELATED APPLICATION DATA

The present application claims priority to Japanese Application No. P2000-24 1787 filed Aug. 9, 2000, which application is incorporated herein by reference to the extent permitted by law.

BACKGROUND OF THE INVENTION

1. Field of the Invention

The present invention relates to a laser beam-generating apparatus which performs wavelength conversion on the input beam by means of a nonlinear optical element and which emits a laser beam of a specific wavelength.

2. Description of the Related Art

A technique has been known in which an optical resonator performs wavelength conversion on the input beam, thus generating the second harmonic of the fundamental wave. Another technique is known, in which beams of different wavelengths are mixed, thereby emitting a laser beam of a desired wavelength. (See A. Ashkin, G. D. Boyd, and J. M. Dziedzic, "Resonant Optical Second Harmonic Generation and Mixing," IEEE J. Quant. Electron. Vol. QE-2, pp. 109–124, 1966.)

A laser beam-generating apparatus, which utilizes such a technique to emit a deep-ultraviolet laser beam having the wavelength of 266 nm, has been put to practical use. The laser beam-generating apparatus uses a green laser beam as the fundamental wave. It comprises an optical resonator having a nonlinear optical element, which is a BBO ($\beta$-barium borate: $\beta$-$BaB_2O_4$) crystal. The green laser beam is applied to the optical resonator and resonated in the optical resonator, thereby generating a deep-ultraviolet laser beam, i.e., the second harmonic. The laser beam-generating apparatus is used as an efficient light source in, for example, laser microscopes.

The laser beam-generating apparatus comprises an optical resonator that changes the wavelength of the input beam. The optical resonator has an optical energy loss. Even if the optical energy loss increases only a little, the efficiency of wavelength conversion will greatly decrease. Consequently, the output of the optical resonator will proportionally decrease. To achieve an effective use of the laser beam-generating apparatus, it would be important to reduce the increase in the optical energy loss in the resonator, thereby to enhance the reliability of the laser beam-generating apparatus.

To reduce the increase in the optical energy loss in any optical resonator, it is important to prevent dirt from sticking to the surfaces of the optical components that constitute the optical resonator. It is known that the dirt on each optical component is a deposit of the impurities in the air, such as ammonium sulfate, formed on that surface of the component which is irradiated with the second harmonic (i.e., deep-ultraviolet laser beam). How the impurities in the air deposit on the optical components remains unclear. Nonetheless, the dirt is considered to have resulted from chemical reaction caused by the deep-ultraviolet laser beam. This is because the impurities deposit on only that part of each component that is irradiated with the deep-ultraviolet laser beam.

The optical resonator incorporated in the above-mentioned laser beam-generating apparatus has a BBO crystal as the nonlinear optical element. The BBO crystal, which is an almost rectangular flat plate, is used because it is easy to process. The green laser beam, or the fundamental wave, is applied to the BBO crystal. In the BBO crystal, the green laser beam passes through an optical path that satisfies the conditions for phase matching. The laser beam immediately emerges from the BBO crystal. As the green laser beam passes through the optical path in the BBO crystal, the second harmonic, i.e., deep-ultraviolet laser beam, is generated from the green laser beam. The deep-ultraviolet beam emerges from the BBO crystal and travels in almost the same optical axis as the green laser beam (i.e., the fundamental wave) does.

The green laser beam and the deep-ultraviolet laser beam, both travelling from the BBO crystal, are applied to a reflector located on their common optical axis. The reflector has a high reflectance to the green laser beam (i.e., fundamental wave) and a high transmittance to the deep-ultraviolet laser beam (i.e., second harmonic). The reflector reflects the green laser beam, which is further reflected by other reflectors and applied back into the BBO crystal. On the other hand, the deep-ultraviolet laser beam passes through the reflector and ultimately emerges from the optical resonator.

Impurities, such as ammonium sulfate, may deposit on that part of the reflector through which the deep-ultraviolet laser beam passes, due to the chemical reaction caused by the deep-ultraviolet laser beam. (Note that this reflector is provided on the common optical axis of the green laser beam and the deep-ultraviolet laser beam, both travelling from the BBO crystal.) Such deposition of impurities results in the decrease of the energy of the fundamental wave, i.e., green laser beam, because the green laser beam is reflected at the said part of the reflector.

To prevent the deposition of impurities, the following measures are taken in manufacturing the laser beam-generating apparatus. First, not only the optical components constituting the optical resonator, but also the mechanical parts for supporting the optical components are thoroughly washed, before the optical resonator is assembled. Further, dry, clean air is continuously applied into the housing of the laser beam-generating apparatus after the optical resonator has been set within the housing.

Notwithstanding these measures are taken, the impurities cannot be completely prevented from depositing on the reflector that is provided on the common optical axis of the green laser beam and the deep-ultraviolet laser beam, both travelling from the BBO crystal. The optical energy loss pertaining to the fundamental wave inevitably increases. Consequently, the efficiency of wavelength conversion greatly lowers in some cases, resulting in a decrease in the output of the laser beam-generating apparatus.

BRIEF SUMMARY OF THE INVENTION

The present invention has been made in view of the forgoing. An object of the invention is to provide a laser beam-generating apparatus in which the deposition of impurities on the surfaces of the optical components is effectively inhibited, thus preventing an increase in the optical energy loss pertaining to the fundamental wave, and which can therefore emits a stable, intense laser beam and therefore has high reliability.

A laser beam-generating apparatus according to the invention comprises: wave-generating means, a nonlinear optical element, wave-reflecting means, and harmonic-reflecting means. The wave-generating means generates a fundamental wave. The nonlinear optical element receives the fundamental wave generated by the wave-generating means and allows the fundamental wave to pass along an optical path satisfying conditions for phase matching, thereby to generate a harmonic wave. The nonlinear optical element has a plurality of internal total reflection planes. It emits the fundamental wave sequentially reflected at the internal total reflection planes, in a direction intersecting with an axis of the fundamental wave applied to the nonlinear optical element. Further, it emits the harmonic wave sequentially reflected at the internal total reflection planes, spatially deviated from the fundamental wave, by utilizing birefringence in the nonlinear optical element and the internal total reflections at the internal total reflection planes. The wave-reflecting means is provided at an intersection of the axis of the fundamental wave applied to the nonlinear optical element and an axis of the fundamental wave emitted from the nonlinear optical element. The wave-reflecting means reflects the fundamental wave emitted from the nonlinear optical element and applies the same again into the nonlinear optical element. The harmonic-reflecting means reflects the harmonic wave emitted from the nonlinear optical element and spatially deviated from the fundamental wave, thereby to emit the harmonic wave from the laser beam-generating apparatus.

In the laser beam-generating apparatus, the wave-generating means generates a fundamental wave. The fundamental wave is applied to the nonlinear optical element. In the element, the fundamental wave is sequentially reflected at the internal total reflection planes. The fundamental wave thus reflected is emitted from the nonlinear optical element, with its axis intersecting with the axis of the fundamental wave being applied to the nonlinear optical element. The wave-reflecting means is provided at the intersection of the axes of the fundamental waves applied to and emitted from the nonlinear optical element, respectively. It reflects the fundamental wave emitted from the nonlinear optical element. Thus reflected, the fundamental wave is applied to the nonlinear optical element again. A closed optical path is therefore formed for the fundamental wave. Thus, an optical resonator is provided.

As the fundamental wave travels in the nonlinear optical element, along the optical path satisfying conditions for phase matching, a harmonic wave is generated from the fundamental wave. The harmonic wave is sequentially reflected at the internal total reflection planes and is emitted from the nonlinear optical element. It is spatially deviated from the fundamental wave, due to the birefringence in the nonlinear optical element and the internal total reflections at the internal total reflection planes. The harmonic-reflecting means reflects the harmonic wave emitted from the nonlinear optical element. The harmonic wave is then emitted from the laser beam-generating apparatus.

Since the fundamental wave and the harmonic wave, both emitted from the nonlinear optical element, are spatially separated from each other in the laser beam-generating apparatus, it is possible not to apply the harmonic wave to the wave-reflecting means which reflects the fundamental wave. Therefore, no chemical reaction takes place, and no impurities, which may be generated by such reaction, deposit on the means for reflecting the fundamental wave. This reliably prevents an optical energy loss at the wave-reflecting means.

In a laser beam-generating apparatus according to the present invention, the nonlinear optical element generates and emits a harmonic, which is spatially deviated from the fundamental wave applied to the nonlinear optical element. It is therefore possible not to apply the harmonic wave to the wave-reflecting means. No chemical reaction takes place, which might occur if the harmonic were applied to the wave-reflecting means. No impurities, which may be generated by such reaction, deposit on the wave-reflecting means. Hence, the laser beam-generating apparatus can attain high wavelength conversion efficiency.

DETAILED DESCRIPTION OF THE INVENTION

Embodiments of the present invention will be described in detail, with reference to the accompanying drawings.

A laser beam-generating apparatus according to the invention has a nonlinear optical element that performs wavelength conversion, thus generating a harmonic. The harmonic is output from the nonlinear optical element, spaced apart from the fundamental wave.

Before the laser beam-generating apparatus is described, the basic concept of the invention will be explained.

Figure 1:
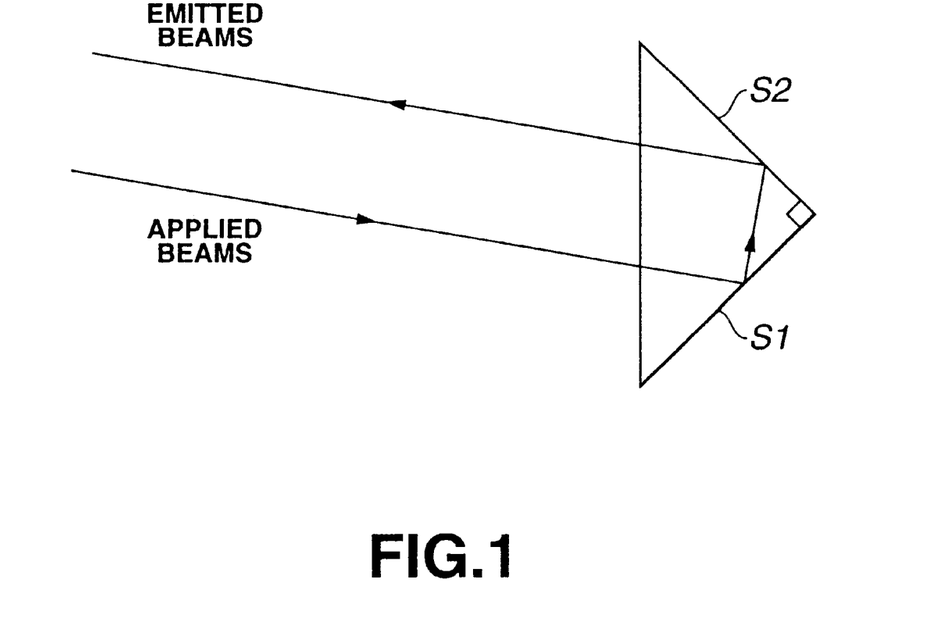
FIG. 1 is a side view of a corner cube reflector.

Assume a light beam passes through a medium having a refractive index n1 and that the light beam is applied to another medium having a refractive index n0 at an incidence angle greater than a particular value. The light beam is totally reflected in this case, not passing through the interface between the two media. This phenomenon is known as "internal total reflection." Total internal reflection is utilized in an optical element called "corner cube reflector." As shown in FIG. 1, the corner cube reflector has two internal total reflection planes S1 and S2. The surfaces S1 and S2 defines an apex angle of 90°. A light beam applied into the corner cube reflector is totally reflected first by the reflection plane S1 and then by the reflection plane S2. After reflected by the surface S2, the light beam is emitted from the corner cube reflector in a direction parallel and opposite to the direction in which it was applied into the corner cube reflector. Corner cube reflectors are used as road guard rails or automobile lamp reflectors.

Figure 2:
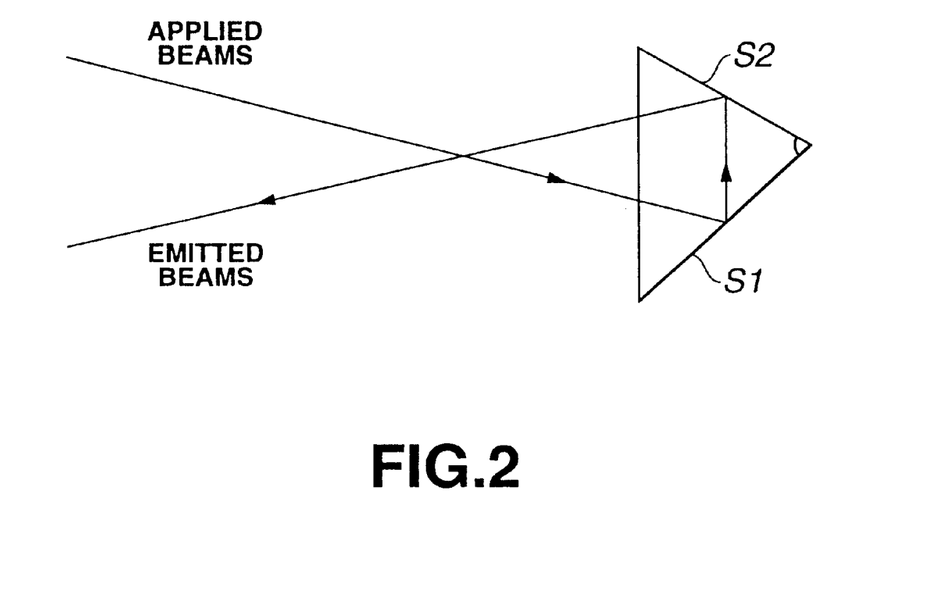
FIG. 2 is a side view of a prism similar to the corner cube reflector.

Consider a prism that is similar to the corner cube reflectors described above but has an apex angle of less than 90°, as is illustrated in FIG. 2. As seen from FIG. 2, a light beam is reflected in the prism twice, first by the internal total reflecting surface S1 and then by the internal total reflecting surface S2, before emitted from the prism. The axis of the output light beam intersects with the axis of the input light beam. An input-coupling mirror may be arranged at the position where the input light beam and the output light beam intersect with each other. In this case, a closed optical path is formed, providing an optical resonator. The technique of combining a prism having two internal total reflection planes S1 and S2 and an input-coupling mirror, thereby forming an optical resonator, is well known in the art. Also known in the art is the technique of using such an optical resonator to perform nonlinear wavelength conversion, thereby generating the second harmonic from the fundamental wave. (Refer to D. C. Gerstenberger, G. E. Tye, and R. W. Wallace, "Efficient second-harmonic conversion of cw single-frequency Nd:YAG laser light by frequency locking to a monolithic ring frequency doubler," Opt. Lett., vol. 16, pp. 992–994, 1991.)

An optical resonator of the structure described above may be used to generate a deep-ultraviolet laser beam. It would be best for the optical resonator to have a prism (nonlinear optical element) made of, for example, BBO (β-barium borate: β-BaB$_2$O$_4$) crystal. A BBO crystal exhibits higher nonlinearity than most of other crystals that are useful in the ultraviolet region. The crystal performs prominent birefringence and can achieve phase matching over a broad wavelength range. It has been used to generate a deep-ultraviolet laser beam by means of the nonlinear wavelength conversion.

Particularly, laser beam-generating apparatuses have been put to practical use in recent years. In a laser beam-generating apparatus, a green laser beam (wavelength: 532 nm), or the second harmonic of a laser beam emitted from a Nd:YAG laser or a Nd:YVO$_4$ laser. The green laser beam is applied into an optical resonator having a BBO crystal, and the optical resonator generates a deep-ultraviolet beam (wavelength: 266 nm), which is the second harmonic of the green laser beam.

In this laser beam-generating apparatus, a green laser beam, or a fundamental wave, is applied into the BBO crystal. In the BBO crystal the laser beam travels in an optical path inclined at about 47.5° to the axis c of the crystal. The green laser beam (ordinary ray) and the deep-ultraviolet laser beam (extraordinary ray), both travelling in the BBO crystal, therefore match in terms of phase velocity. In other words, they undergo phase matching. Hence, the energy of the green laser beam, i.e., the fundamental wave, is efficiently converted to a deep-ultraviolet laser beam, i.e., the second harmonic.

Figure 3:
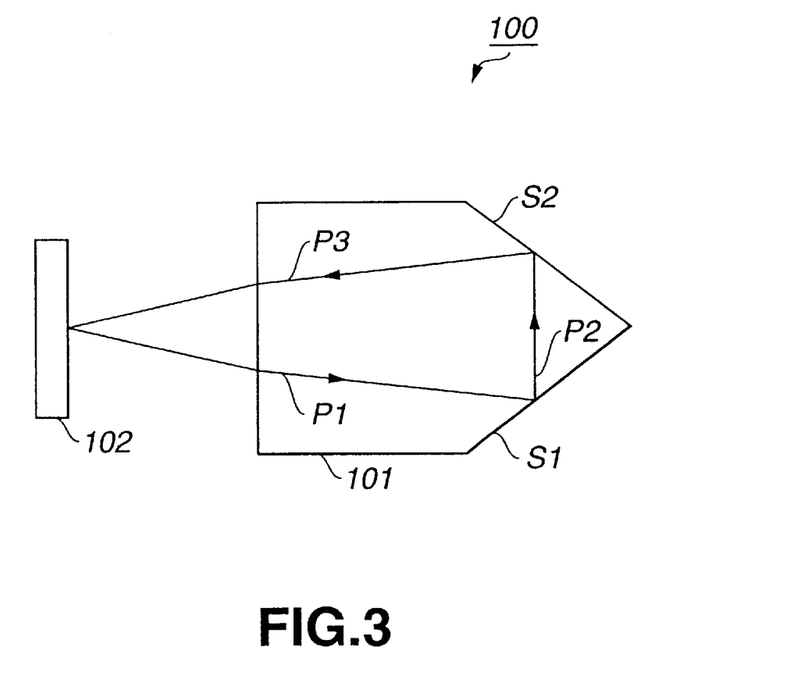
FIG. 3 is a diagram showing an optical resonator that comprises a nonlinear optical element and a input-coupling mirror.

An optical resonator 100 of FIG. 3, constituted by the non linear optical element made of BBO crystal, wherein an internal total reflection such as the prism is generated, and an input-coupling mirror, will be described hereinafter.

The BBO crystal has a refractive index n1 of about 1.674. Since the refractive index n0 of air is 1, the critical angle θc for the total reflection of the beam in the nonlinear optical element 101 (i.e., BBO crystal) is about 36.7°, as can be seen from the following equation (1).

$$\theta c = \sin^{-1} n0/n1 \qquad (1)$$

Thus, if the nonlinear optical element 101 has an apex angle α0 of nearly 90° and if the green laser beam is applied to the internal total reflection plane S1 at about 52° at most, the green laser beam will be applied to the internal total reflection plane S2 at an angel equal to or greater than the critical angle. In this case, the green laser beam is totally reflected at both internal total reflection planes S1 and S2 before it emerges from the nonlinear optical element 101. An input-coupling mirror 102 may be located at the position where the input green laser beam and the output green laser beam intersect with each other. Then, the nonlinear optical element 101 and the input-coupling mirror 102 constitute a closed optical path, providing the optical resonator 100.

The input green laser beam travels in the nonlinear optical element 101 of the optical resonator 100, through three optical paths until it emerges from the nonlinear optical element 101. First, the beam travels through the first optical path P1 until it is totally reflected by the first internal total reflection plane S1. Then, it travels through the second optical path P2 until it is totally reflected by the second internal total reflection plane S2. Finally, it travels through the third optical path P3 until it emerges from the nonlinear optical element 101.

Figure 4:
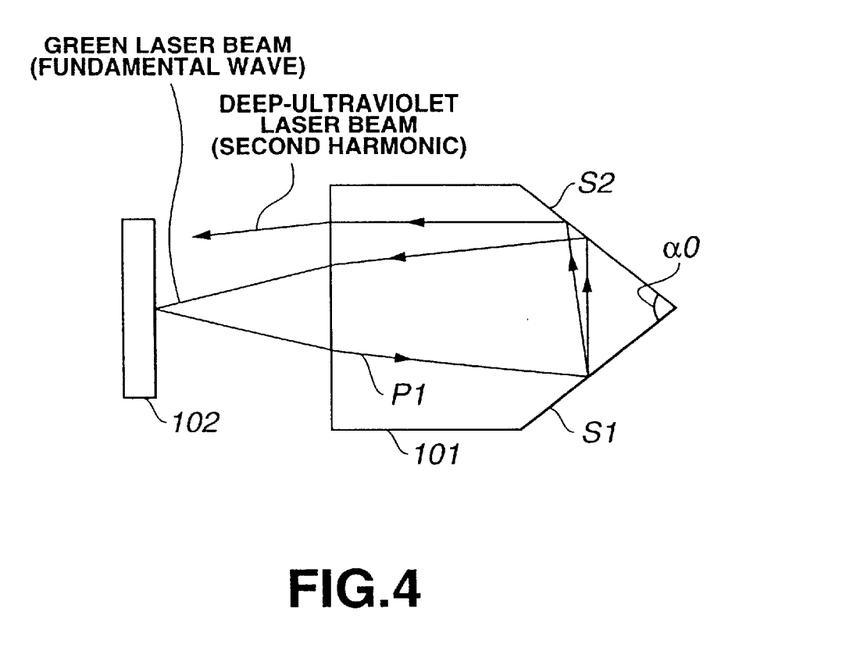
FIG. 4 is a diagram of the optical resonator, illustrating how the deep-ultraviolet laser beam generated in the nonlinear optical element is emitted from the nonlinear optical element, spaced from the green laser beam that is the fundamental wave.

The first optical path P1 may be inclined at about 47.5° to the axis c of the BBO crystal, thus satisfying the condition for phase matching. If so, a deep-ultraviolet laser beam, which is the second harmonic of the green laser beam, will be generated while the green laser beam is propagating in the nonlinear optical element 101 along the first optical path P1. The deep-ultraviolet laser beam thus generated emerges from the element 101 after reflected first by the first internal total reflection plane S1 and then by the second internal total reflection plane S2. The deep-ultraviolet laser beam is emitted from the element 101, travelling in a path spaced apart from the green laser beam (i.e., the fundamental wave) as is illustrated in FIG. 4. This is because the deep-ultraviolet laser beam has undergone double refraction in the nonlinear optical element 101 and has been reflected twice, first at the internal total reflection plane S1 and then at the internal total reflection plane S2.

If the second optical path P2 satisfies the conditions for phase matching, it is possible to generate a deep-ultraviolet laser beam as the green laser beam passes through the second optical path P2. It is also possible to emit the deep-ultraviolet laser beam from the nonlinear optical element 101 in a path spaced from the green laser beam emerging from the element 101. In this case, however, the deep-ultraviolet laser beam will deviate from the green laser beam in a greater amount than in the case where the first optical path P1 satisfies the conditions for phase matching.

As indicated above, the deep-ultraviolet laser beam generated in the nonlinear optical element 101 is emitted from the element 101, spatially deviated from the green laser beam. The mirror other than the input-coupling mirror 102 that reflects the green laser beam reflects the deep-ultraviolet laser beam thus emitted from the element 101. The deep-ultraviolet laser beam can therefore emerge from the optical resonator 100, without being applied to the input-coupling mirror 102.

How the deep-ultraviolet laser beam (i.e., second harmonic of the green-laser beam) is spatially deviated from the green laser beam (i.e., fundamental wave) will be explained on the assumption that the incidence planes at which the green laser beam nonlinear is totally reflected in the nonlinear optical element 101 (i.e., BBO crystal) contain the axis c of the BBO crystal.

The green laser beam, which is the fundamental wave, is an ordinary ray. It is polarized in a direction perpendicular to the axis c of the BBO crystal. It is therefore always an "s-polarized beam" with respect to the internal total reflection planes. In other words, the ordinary reflection rule that the angle of incidence is equal to the angle of reflection holds true when the green laser beam is reflected in the nonlinear optical element 101, first at the internal total reflection plane S1 and then at the total reflection plane S2.

Figure 5:
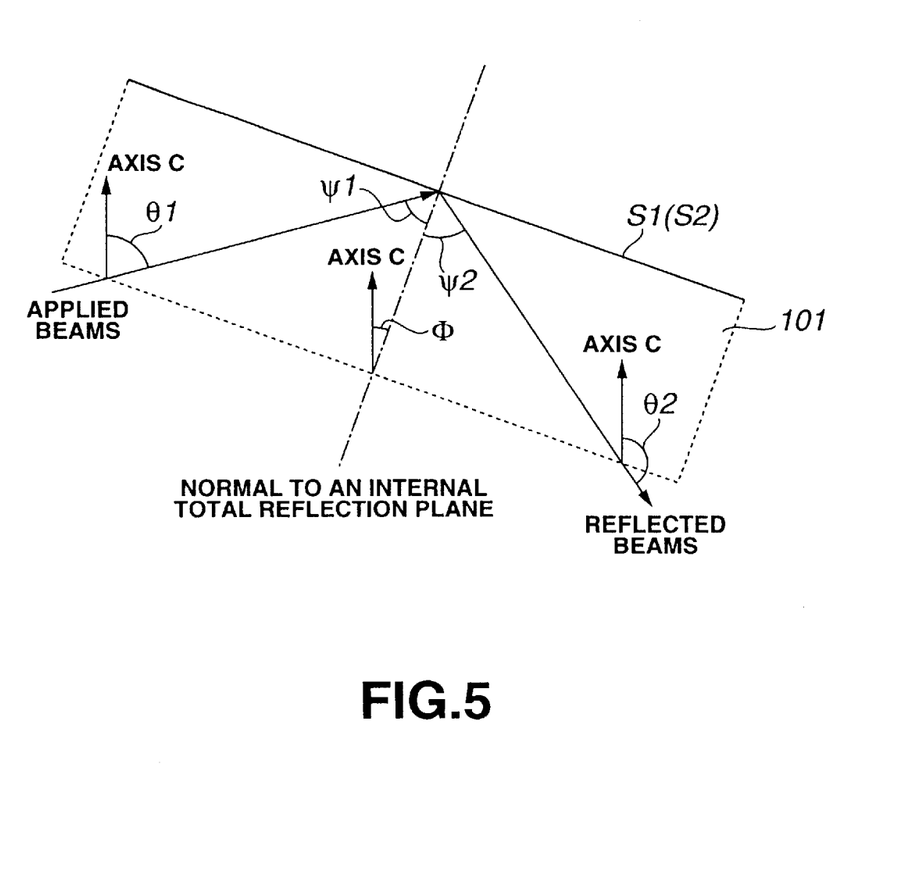
FIG. 5 is a diagram explaining how the deep-ultraviolet laser beam is spaced from the green laser beam when light is applied to the nonlinear optical element at an incidence angle of a positive value.

By contrast, the deep-ultraviolet laser beam, which is the second harmonic of the green laser beam, is an extraordinary ray. The ordinary reflection rule may not hold true when the deep-ultraviolet laser beam is reflected in the nonlinear optical element 101, first at the internal total reflection plane S1 and then at the total reflection plane S2. This is because the deep-ultraviolet laser beam undergoes birefringence at each internal total reflection plane. As FIG. 5 shows, the angle θ1 between the axis of the beam incident to the total reflection plane S1 (S2) and the axis c of the BBO crystal is different from the angle θ2 between the axis of the beam reflected from the total reflection plane S1 (S2) and the axis c of the BBO crystal. As a result, the beam incident to the plane S1 (S2) and the beam reflected from the plane S1 (S2) differ in terms of refractive index and phase velocity. Note that Ψ1 and Ψ2 shown in FIG. 5 are the angle of incidence and the angle of reflection, respectively. Further, Φ also shown in FIG. 5 is the angle between the normal to the plane S1 (S2) and the axis c of the BBO crystal.

To predict the behavior of the birefringence, some calculation is required. The boundary condition that should be satisfied in the calculation is that the k vector (wave normal) has components in the internal total reflection plane S1 (S2), which are equal to each other. Hence, the birefringence at the plane S1 (S2) shown in FIG. 5 can be given by the following equations (2) and (3):

$$n(\theta 1)\sin(\Psi 1) n(\theta 2)\sin(\Psi 2) \quad (2)$$

$$n(\theta 1)\sin(\theta 1-\Phi)=n(\theta 2)\sin(\theta 2-\Phi) \quad (3)$$

Thus, the green laser beam, i.e., the fundamental wave totally reflected from the internal total reflection plane S1 (S2), has one k vector of a specific angle and the deep-ultraviolet laser beam, i.e., the second harmonic, has another k vector of an angle different from that of the k vector of the green laser beam. The deep-ultraviolet laser beam emitted from the element 101 is therefore spatially deviated from the green laser beam, due to the birefringence that takes place at each internal total reflection plane. The green laser beam and the deep-ultraviolet laser beam are further spaced apart from each other, also due to the walk-off effect of the birefringence in the BBO crystal.

To determine how much the green laser beam (i.e., fundamental wave) and the deep-ultraviolet laser beam (i.e., second harmonic) are spaced apart, we need to examine the optical paths within the optical resonator 100. The free variables involved here are the interaction time of the BBO crystal, the distance the beam travels in the resonator 100 unit it reach the BBO crystal, the distance the beam travels in the resonator 100 after emitted from the BBO crystal, the apex angle α0 of the nonlinear optical element 101, and the angle Ψ1 of incidence to the first internal total reflection plane S1.

Figure 6:
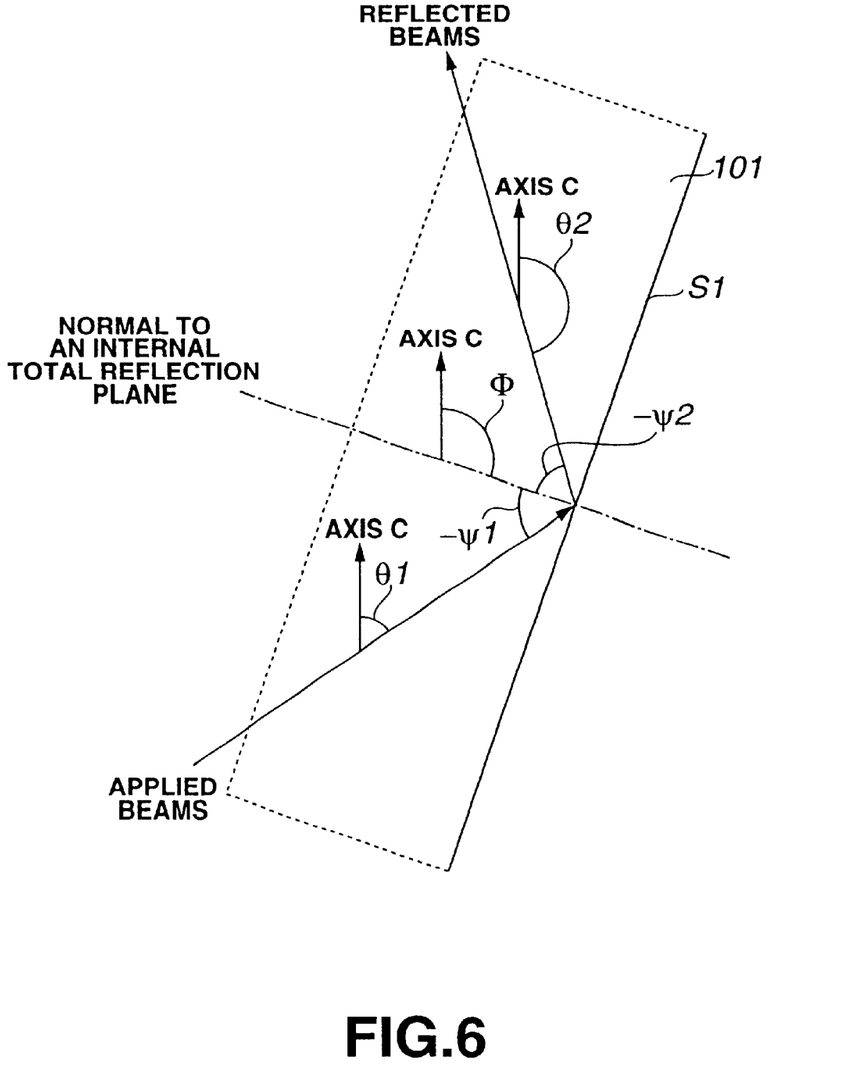
FIG. 6 is a diagram explaining how the deep-ultraviolet laser beam is spaced from the green laser beam when light is applied to the nonlinear optical element at an incidence angle of a negative value.

The angle (θ1) between the first optical path P1 and the axis c of the BBO crystal is a constant (about 47.5°). The azimuth angle of the light beam applied into the nonlinear optical element 101 is equal to the azimuth angle of the light beam emitted from the element 101. The optical path along which the laser beam travels in the optical resonator 100 is determined from the angle (θ1) and the azimuth angle of the light beam applied into and emitted from the element 101. The angle Ψ1 at which the light beam is applied to the first internal total reflection plane S1 of the nonlinear optical element 101 is one of two possibilities. The first possibility is the angle at which the beam is applied in a positive direction, as is illustrated in FIG. 6. The second possibility is the angle at which the beam is applied in a negative direction, as is depicted in FIG. 6. In this case, the angle is indicated as "−Ψ1."

As described above, the critical angle θc for the total reflection of the beam in the nonlinear optical element 101 (i.e., BBO crystal having a refractive index of about 1.674) is approximately 36.7°. The incidence angle Ψ1 of the light beam needs to be greater than 36.7°. In order for the single input-coupling mirror 102 to reflect the green laser beam (i.e., fundamental wave) emitted from the element 101, thereby to form a closed optical path, the nonlinear optical element 101 needs to have an apex angle α0 of less than 90°. The sum of the incidence angles to the first and second internal total reflection planes S1 and S2 is equal to the apex angle α0 of the nonlinear optical element 101. It is therefore required that the incidence angle Ψ1 at which the beam is applied to the first and second internal total reflection planes S1 and S2 be 53.3° at most.

Figure 7:
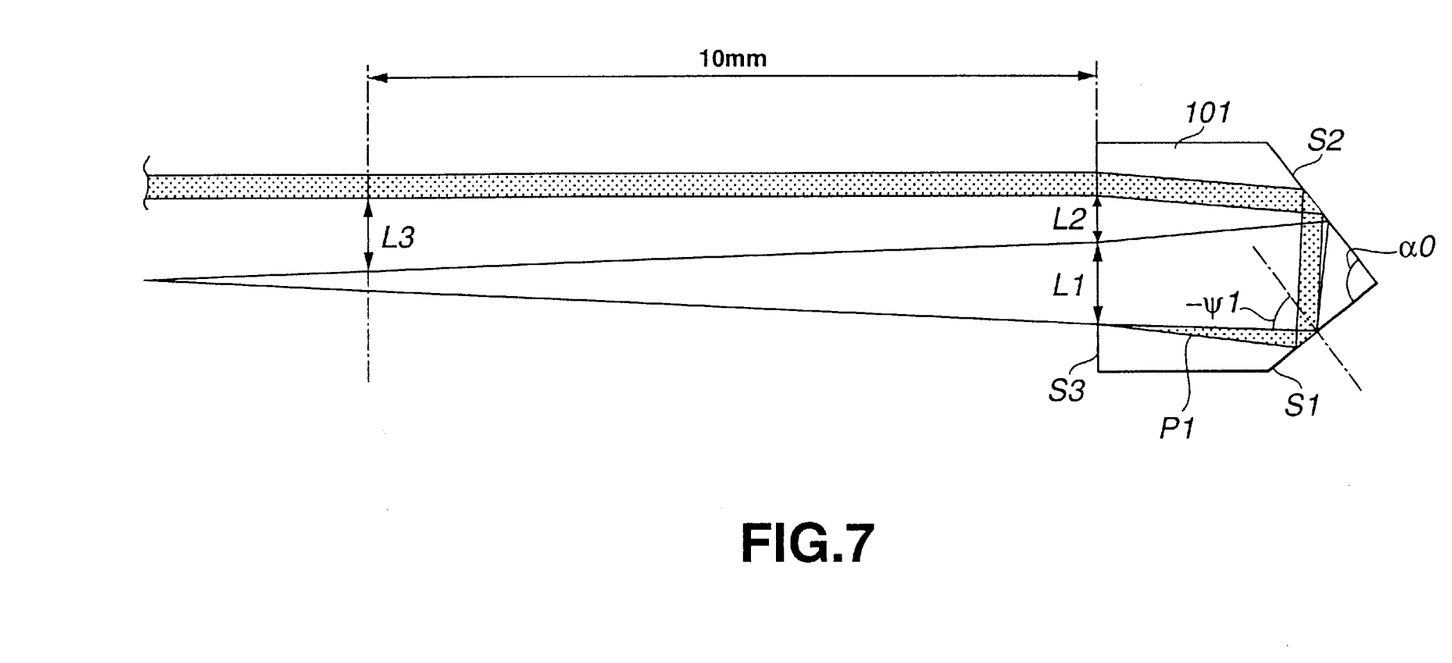
FIG. 7 is a diagram for explaining preferred optical design for in which the deep-ultraviolet laser beam is spaced from the green laser beam.

Considering the above-mentioned factors, the inventors hereof designed a best laser beam-generating apparatus. They found that the deep-ultraviolet laser beam (i.e., second harmonic) well deviated from the green laser beam (i.e., fundamental wave) when the following two conditions are satisfied. First, the nonlinear optical element 101 has an apex angle α0 of 88.5° as shown in FIG. 7. Second, the incidence angle Ψ1 to the first internal total reflection plane S1 is 50° in the negative direction, that is, −Ψ1=50°, as is illustrated in FIG. 7.

More specifically, the nonlinear optical element 101 had a first optical path P1 that was 5 mm long, and the two points where the green laser beam is applied to, and emerges from, the element 101, respectively, were spaced apart by a distance L1 of about 2 mm. The distance L2 between the point where the deep-ultraviolet laser beam emerged from the element 101 and the point where the green laser beam emerged from the element 101 was 0.9 mm or more. The axes of the green beam and deep-ultraviolet laser beam, both emitted from the element 101, were spaced apart by 1.5 mm or more at a position about 10 mm remote from the input/output plane S3 of the nonlinear optical element 101. It was confirmed that the green laser beam and the deep-ultraviolet laser beam were well spaced from each other.

Figure 8A:
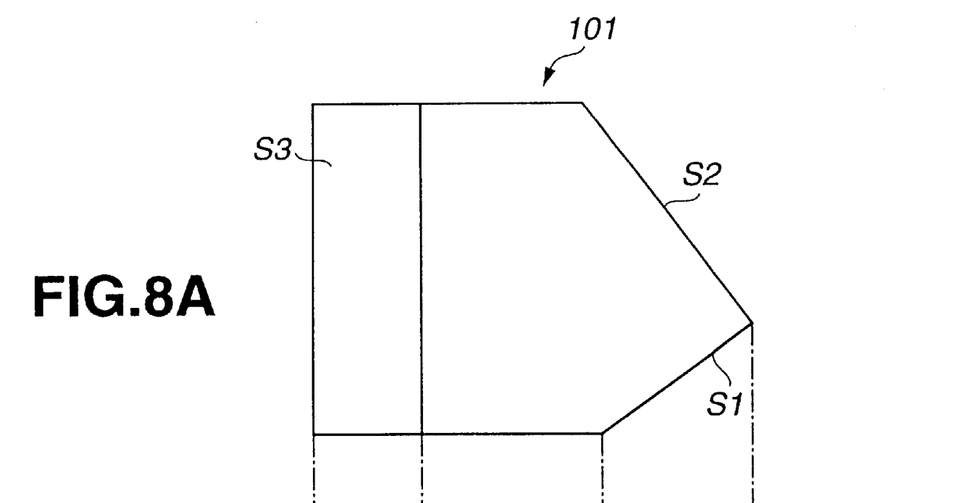
FIG. 8A is a side view of a nonlinear optical element that has an input/output plane inclined at almost a Brewster angle to the axis of the green laser beam applied into the optical element.
Figure 8B:
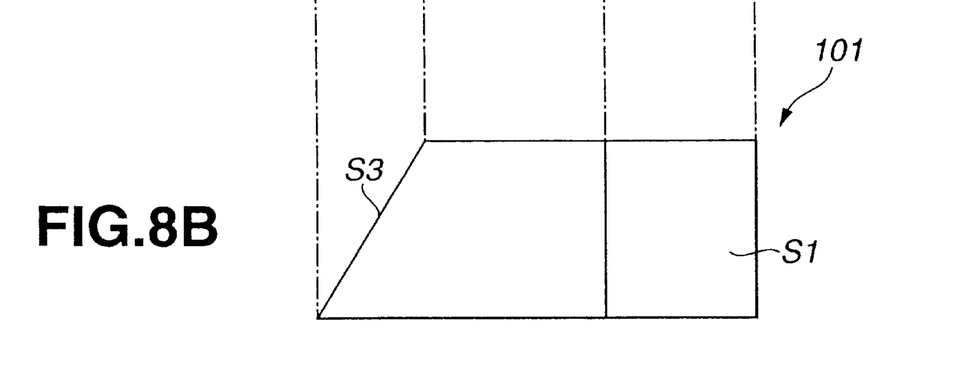
FIG. 8B is a bottom view of the nonlinear optical element shown in FIG. 8A.

FIGS. 8A and 8B shows a nonlinear optical element 101 that has an input/output plane S3 inclined at almost a Brewster (polarization) angle to the axis of the green laser beam applied into the optical element 101. FIG. 8A is a side view of the nonlinear optical element 101, and FIG. 8B is a bottom view of the element 101.

The input/output plane S3 of the nonlinear optical element 101 is inclined at almost a Brewster angle to the axis of the green laser beam applied into the optical element 101. Therefore, the optical energy loss (i.e., reflection loss) at the input/output plane S3 is minimized. This makes it possible to enhance the efficiency of wavelength conversion in the optical resonator 100.

Although the nonlinear optical element 101 has its input/output plane S3 so designed as described above, the direction in which the green laser beam (i.e., ordinary ray) is polarized does not completely agree with the input/output plane S3. An optical energy loss, though limited, inevitably results in. This optical energy loss is determined by the azimuth angle the green laser beam applied to the element 101 has with respect to the input/output plane S3. The loss is a function of the apex angle α0 of the nonlinear optical element 101. As pointed out above, the apex angle α0 is 88.5°. The azimuth angle of the green laser beam applied to the element 101 has with respect to the input/output plane S3 is 1.5°. The optical energy loss resulting from the fact the polarization direction of the green laser beam does not agree with the input/output plane S3 is very small, only 0.15%. Note that this optical energy loss is the sum of the loss made when the green laser beam enters the element 101 and the loss made when the green laser beam emerges from the element 101.

The following Table 1 shows the angles between the directions (first to third optical paths) in which the green laser beam (i.e., fundamental wave having a wavelength of 532 nm) travels in the nonlinear optical element 101, on the one hand, and the angle between the direction which the deep-ultraviolet beam (i.e., second harmonic having a wavelength of 266 nm) and the axis c of the BBO crystal. It should be noted here that the k vector extends in the wave normal and that the s vector is a pointing vector, extending in the energy-transmitting direction. The k vector and the s vector extend in the same direction because the green laser beam, which is the fundamental wave, is an ordinary ray.

TABLE 1

| | Green laser beam k vector, s vector | Deep-ultraviolet laser beam k vector | Deep-ultraviolet laser beam s vector |
|---|---|---|---|
| 1st optical path | 47.5° | 47.5° | 52.3° |
| 2nd optical path | 327.5° | 326.15° | 321.47° |
| 3rd optical path | 224.5° | 226.78° | 231.64° |

The input-coupling mirror 102 may be arranged at the intersection of the axis of the green laser beam applied into the nonlinear optical element 101 and the axis of the green laser beam emitted from the element 101. Then, the optical energy loss at the element 101 can be minimized in the optical resonator 100. In addition, the deep-ultraviolet laser beam (i.e., second harmonic) is emitted from the nonlinear optical element 101, spatially deviated from the green laser beam (i.e., fundamental wave). Thus, the deep-ultraviolet laser beam can be reflected by the mirror other than the input-coupling mirror 102 before emitted from the element 101, without being applied to the input-coupling mirror 102. Since the deep-ultraviolet laser beam is not applied to the input-coupling mirror 102, no chemical reaction takes place at the mirror 102 and no impurities is generated thereby to deposit on the mirror 102. An optical energy loss, if any, at the input-coupling mirror 102 can therefore be reduced, which much increases the efficiency of wavelength conversion in the optical resonator 100.

Since the deep-ultraviolet laser beam is not applied to the input-coupling mirror 102 at all, the mirror 102 can be of any structure so long as it can reflect the green laser beam. It need not be one that has wavelength selectivity, like a dichroic mirror. Moreover, the optical resonator 100 comprises only a few components, that is, one nonlinear optical element 101 and one input-coupling mirror 102. The optical resonator 100 can therefore be manufacture at low cost.

Figure 9:
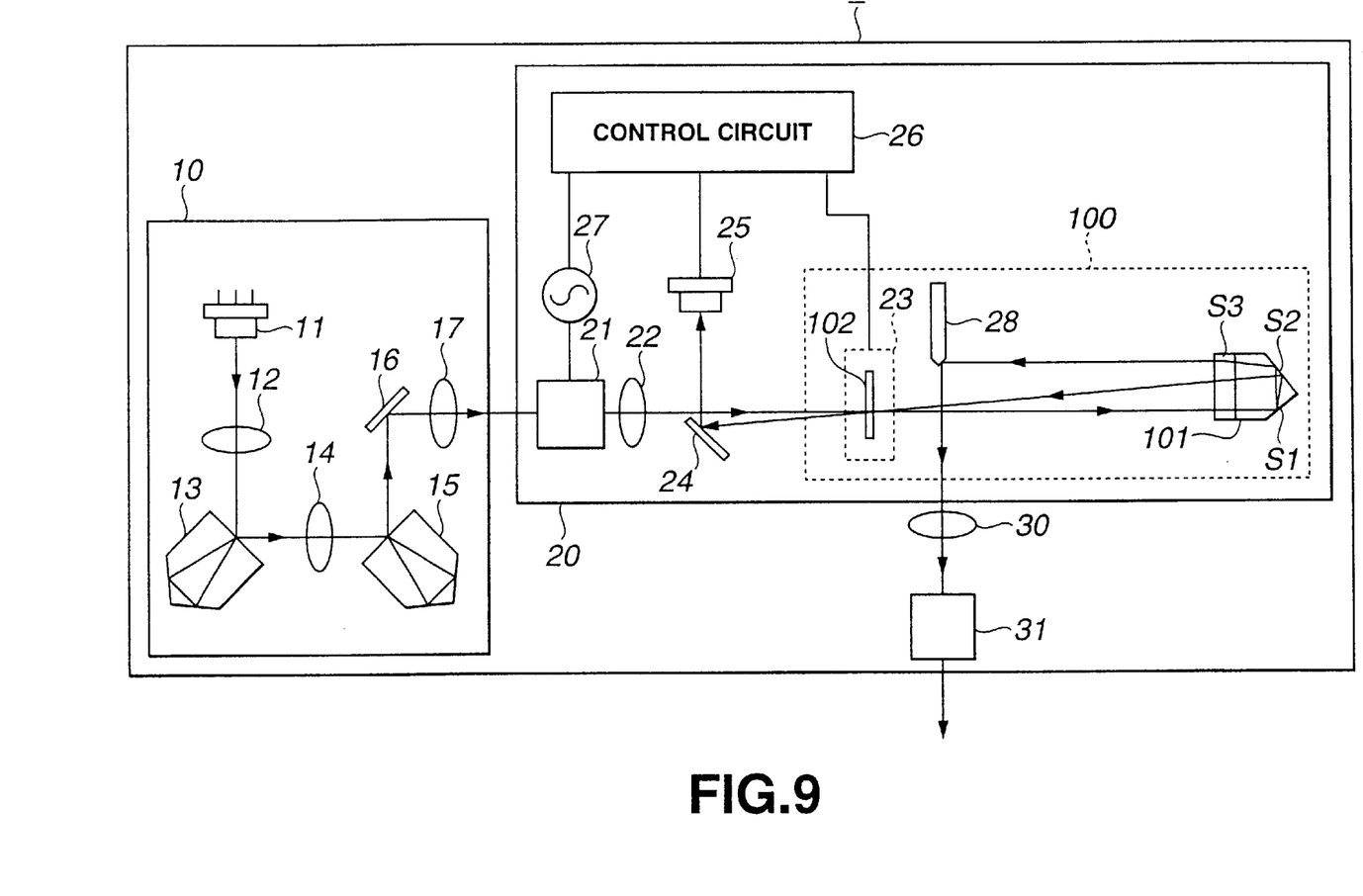
FIG. 9 is a schematic representation of a laser beam-generating apparatus according to the present invention.

A laser beam-generating apparatus 1 according to the present invention, which incorporates the optical resonator 100 described above, will be described in detail with reference to FIG. 9.

The laser beam-generating apparatus 1 is designed to generate a green laser beam (wavelength: 532 nm) that is the second harmonic of a Nd:YAG laser and then generate a deep-ultraviolet laser beam (wavelength: 266 nm) that is the second harmonic of the green laser beam, i.e., the fundamental wave. As FIG. 9 shows, the apparatus 1 comprises a green laser beam-generating section 10 and a deep-ultraviolet laser beam-generating section 20. The section 10 is configured to generate a green laser beam. The section 20 is configured to perform wavelength conversion the green laser beam generated by the section 10, thereby to generate a deep-ultraviolet laser beam.

In the green laser beam-generating section 10, the semiconductor laser 11 emits an intense laser beam that has a wavelength of 808 nm. The focusing lens 12 focuses the intense laser beam from the semiconductor laser 11. The beam thus focused is applied to the non-planer monolithic, ring-shaped Nd:YAG laser 13, exciting the Nd:YAG laser 13. Excited with the beam, the Nd:YAG laser 13 emits an infrared laser beam that has a wavelength of 1064 nm.

In the green laser beam-generating section 10, the infrared laser beam emitted from the Nd:YAG laser 13 passes through the mode-matching lens 14. The beam is then applied to the monolithic ring-shaped MgO:LN crystal 15. In the crystal 15, the resonant wavelength is equal to the wavelength of the infrared laser beam. The crystal 15 therefore functions as an optical resonator to the infrared laser beam. It performs wavelength conversion on the infrared laser beam, generating a green laser beam, which is the second harmonic of the infrared laser beam and which has a wavelength of 532 nm.

In the green laser beam-generating section 10, the reflecting mirror 16 reflects the green laser beam emitted from the MgO:LN crystal 15. The green laser beam thus reflected is applied to the lens 17, which shapes the beams into one having a predetermined diameter. The green laser beam thus shaped is output from the green laser beam-generating section 10.

The green laser beam emitted from the green laser beam-generating section 10 is applied into the deep-ultraviolet laser beam-generating section 20. The section 20 comprises a nonlinear optical element made of, for example, a BBO (β-barium borate: β-BaB$_2$O$_4$) crystal. The section 20 is configured to perform wavelength conversion on the green laser beam, thereby to generate a deep-ultraviolet laser beam, which is the second harmonic of the green laser beam and which has a wavelength of 266 nm.

In the deep-ultraviolet laser beam-generating section 20, the green laser beam, or the fundamental wave passes through the phase modulator 21 and the mode-matching lens 22. The green laser beam is applied to the optical resonator 100. In the optical resonator 100, the green laser beam is applied through the input-coupling mirror 102 into the nonlinear optical element 101.

In the laser beam-generating apparatus 1, the input-coupling mirror 102 is mounted on the high-precision positioning means 23 that comprises a piezoelectric element, a voice coil motor, or the like. When the positioning means 23 is driven, the resonance length of the optical resonator 100 with a very high precision.

In the laser beam-generating apparatus 1, the input-coupling mirror 102 reflects a part of the green laser beam applied into the optical resonator 100. Further, the mirror 24 reflects the green laser beam, which is detected by the photodetector 25. The photodetector 25 generates a signal, which is supplied to the control circuit 26. In the deep-ultraviolet laser beam-generating section 20, the phase modulator 21 modulates the phase of the green laser beam applied into the optical resonator 100, in accordance with a modulated signal supplied from the phase modulator drive circuit 27.

The control circuit 26 uses the modulated signal, performing synchronous detection on the signal supplied from the photodetector 25 and thereby detecting an error signal that represents the phase difference between the beams traveling along the optical paths in the optical resonator 100. In accordance with the error signal the control circuit 26 drives the high-precision positioning means 23. Thus driven, the positioning means 23 continuously changes the position of the output-coupling mirror 102 with high precision. Therefore, the optical resonator 100 can always have the desired resonance length. The error signal can be detected by the techniques known in the art. One of these techniques is FM side-band method called "Pound-Drever method," which is disclosed in R. W. P, Drever, J. L. Hall, F. V. Kowalski, J. Hough, G. M. Ford, A. J. Munley, and H. Ward, "Laser phase and frequency stabilization using an optical resonator," Appl. Phys. B, vol. 31, pp. 97–105, 1983. Another of these techniques is a polarization method known as "Hansch-Couillaud method," which is disclosed in T. W. Hansch and B. Couilland, "Laser frequency stabilization by polarization spectroscopy of a reflecting reference cavity," Opt. Comm., vol. 35, pp. 441–444, 1980.

In the laser beam-generating apparatus 1, the error signal detected by the control circuit 26 drives the high-precision positioning means 23. Thus driven, the positioning means 23 continuously changes the position of the output-coupling mirror 102 with high precision, whereby the optical resonator 100 always has the desired resonance length. The nonlinear optical element 101 can therefore generate a deep-ultraviolet laser beam at high efficiency. In other words, the element 101 can perform wavelength conversion on the green laser beam at high efficiency. In the optical resonator 100, the green laser beam passes through the input-coupling mirror 102 and applied into the nonlinear optical element 101, at the input/output plane S3 that is inclined at almost a Brewster angle to the axis of the green laser beam. In the nonlinear optical element 101, the green laser beam travels along the first optical path P1 that is inclined at about 47.5° to the axis c of the BBO crystal. The green laser beam is then applied to the first internal total reflection plane S1.

As the green laser beam travels along the first optical path P1 in the nonlinear optical element 101, a deep-ultraviolet laser beam having a wavelength of 266 nm is generated. The deep-ultraviolet laser beam is the second harmonic of the green laser beam.

Meanwhile, the green laser beam is totally reflected from the first internal total reflection plane S1 and applied to the second total reflection plane S2. The second total reflection plane S2 totally reflects the green laser beam, which is emitted from the nonlinear optical element 101. The input-coupling mirror 102 reflects the green laser beam, which is again applied into the nonlinear optical element 101.

As indicated above, the deep-ultraviolet laser beam is generated as the green laser beam travels along the first optical path P1 in the nonlinear optical element 101 that satisfies the conditions for phase matching. The deep-ultraviolet laser beam also undergoes total reflection, first at the first internal total reflection plane S1 and then at the second total reflection plane S2. Thereafter, the deep-ultraviolet laser beam emerges from the input/output plane S3. Thus, it is emitted from nonlinear optical element 101. Note that in the nonlinearly optical element 101, the deep-ultraviolet laser beam undergoes birefringence and is reflected twice at the first and second total reflection planes S1 and S2. The deep-ultraviolet laser beam is therefore emitted from the element 101, spatially deviated from the green laser beam, i.e., the fundamental wave. Outside the nonlinear optical element 101, the reflecting mirror 28 comprising a knife-edged prism or the like reflects the deep-ultraviolet laser beam, which is emitted from the deep-ultraviolet laser beam-generating section 20.

The deep-ultraviolet laser beam-generating section 20 that has the structure specified above can generate a deep-ultraviolet laser beam that excels in time-coherence characteristic, with high efficiency. When the green laser beam-generating section 10 applies a green laser beam of about 600 mW to the deep-ultraviolet laser beam-generating section 20, the section 20 generated a deep-ultraviolet laser beam of about 200 mW at most. This output value of the section 20 reveals that an reflection loss of about 22% occurred at the input output plane S3. If the reflection loss at the plane S3 in terms of the intensity of the deep-ultraviolet laser beam is reduced, the deep-ultraviolet laser beam-generating section 20 will generate an deep-ultraviolet laser beam that has a magnitude of 250 mW or more. Then, the wavelength conversion efficiency will be has high as 40% or more. Additionally, the beam-generating section 20 was found to keep operating for 300 hours, emitting a deep-ultraviolet laser beam of about 100 mW or more, without the necessity of sealing its interior from the atmosphere or applying clean air into it.

The collimator lens 30 changes the deep-ultraviolet laser beam emitted from the beam-generating section 20, to a parallel deep-ultraviolet laser beam. The anamorphic prism-pair 31 adjusts the shape of the parallel deep-ultraviolet laser beam, which is output from the laser beam-generating apparatus 1. It should be noted that the deep-ultraviolet laser beam emitted from the section 20 has an elliptical cross section due to the walk-off effect of the birefringence that takes place in the nonlinear optical element 101. The anamorphic prism-pair 31 changes the cross section of the beam to an almost circular one. Thus, a deep-ultraviolet laser beam having an almost circular cross section is output from the laser beam-generating apparatus 1.

As described above, the monolithic ring-shaped MgO:LN crystal 15 performs wavelength conversion on the infrared laser beam emitted from the Nd:YAG laser 13 in the laser beam-generating apparatus 1. The crystal 15 generates a green laser beam, which is the second harmonic of the infrared laser beam. The nonlinear optical element 101 comprising, for example, a BBO crystal, carries out wavelength conversion on the green laser beam, generating a deep-ultraviolet laser beam that is the second harmonic of the green laser beam. The deep-ultraviolet laser beam is emitted from the laser beam-generating apparatus 1. That is, the laser beam-generating apparatus 1 uses only solid-state components to generate a deep-ultraviolet laser beam.

Comprising only solid-state components, the laser beam-generating apparatus 1 is small as a whole. The apparatus 1 can yet attains high conversion efficiency, low power consumption and high operating stability and can generate a high-quality laser beam. In short, it excels in operating performance. Moreover, the deep-ultraviolet laser beam that the apparatus 1 generates exhibits excellent time-coherence characteristic.

In the laser beam-generating apparatus 1, the deep-ultraviolet laser beam is never applied to the input-coupling mirror 102 that is a major component of the optical resonator 100, like the nonlinear optical element 101. Hence, reflectance, transmittance or the like with respect to the deep-ultraviolet laser beam need not be taken into account in designing the input-coupling mirror 102. It is therefore unnecessary for the apparatus 1 to incorporate components that have wavelength selectivity like a dichroic mirror. This increases the freedom of designing the input-coupling mirror 102. The input-coupling mirror 102 can therefore be a mirror of low energy loss. As pointed out above, the input-coupling mirror 102 can reflect laser beams that have long wavelength as compared to the green laser beam. Thus, the mirror 102 can be made of any material that may be used to provide low energy-loss mirrors by the existing mirror-manufacturing techniques, though may not be used to form a mirror that reflect deep-ultraviolet laser beams. One example of such material is tantalum pentoxide.

In the laser beam-generating apparatus 1, deep-ultraviolet laser beams are never applied to the input-coupling mirror 102. In designing the input-coupling mirror 102, it is therefore unnecessary to consider the damage resistance that the mirror 102 should have to deep-ultraviolet laser beams. In designing an optical component it is generally difficult to reduce the optical energy loss and to enhance the damage resistance to laser beams. That is, a decrease in optical energy loss and an increase in the damage resistance are usually traded off, one with the other. In the optical resonator 100, the input-coupling mirror 102 can be designed to minimize the optical energy loss. The laser beam-generating apparatus 1 can therefore attain high conversion efficiency.

Furthermore, no chemical reaction takes place at the input-coupling mirror 102 and no impurities are generated thereby to deposit on the mirror 102 in the laser beam-generating apparatus 1. This is because the deep-ultraviolet laser beam is not applied to the input-coupling mirror 102. An optical energy loss, if any in the green laser beam, at the input-coupling mirror 102 can therefore be reduced, whereby the efficiency of wavelength conversion is increased very much. The optical components is not necessary to thoroughly washed or clean air need not be applied into the laser beam-generating apparatus 1, as is required in the conventional laser beam-generating apparatuses to prevent impurities from depositing on the deposit on the input-coupling mirror.

The present invention is not limited to the laser beam-generating apparatus 1 that has been described above. Various changes can be made, if necessary.

Figure 10:
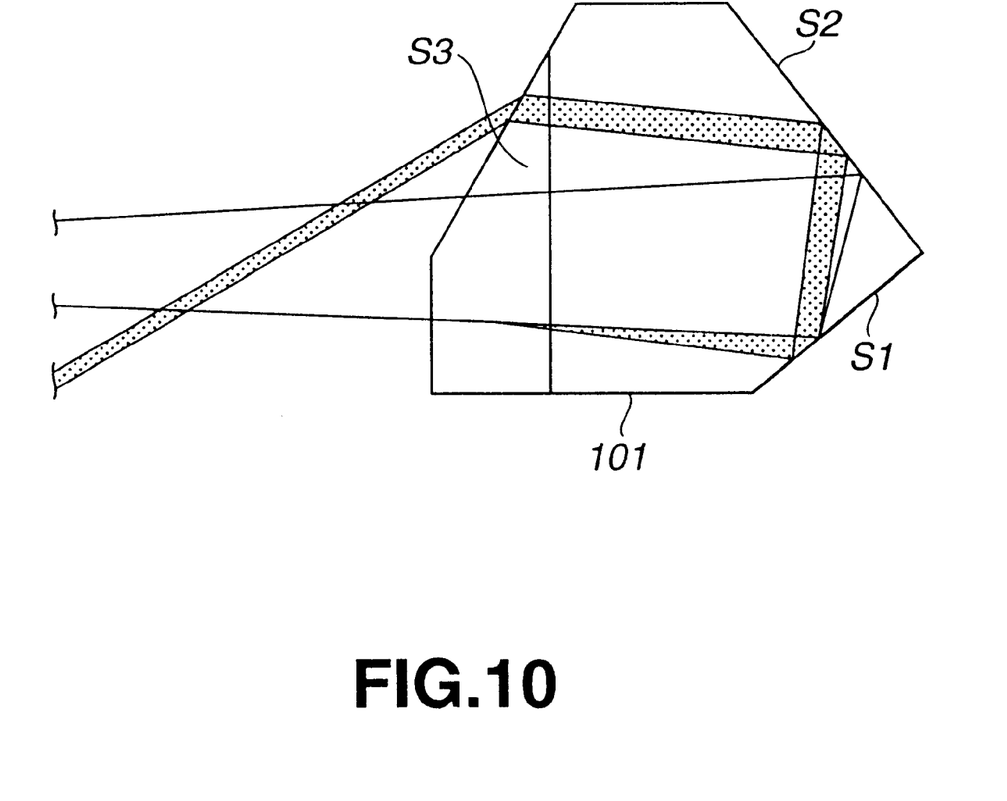
FIG. 10 shows another type of a nonlinear optical element, which has an input/output plane emitting a deep-ultraviolet beam and inclined at almost a Brewster angle to the axis of the deep-ultraviolet beam.

In the embodiment described above, the nonlinear optical element 101 has its input/output plane S3 inclined at almost a Brewster angle to the axis of the green laser beam applied into the optical element 101. For example, that part of the input/output plane S3 from which the deep-ultraviolet laser beam is emitted may be inclined, as shown in FIG. 10, at almost a Brewster angle to the axis of the deep-ultraviolet laser beam. If this is the case, the nonlinear optical element 101 has a more complex shape, rendering it difficult to manufacture the nonlinear optical element 101. Nevertheless, it is possible to decrease the reflection loss in the deep-ultraviolet laser beam, which occurs in the nonlinear optical element 101. That is, since said part of the input/output plane S3 is inclined at almost a Brewster angle to the deep-ultraviolet laser beam, the reflection loss of the deep-ultraviolet laser beam, at the input/output plane S3, can be reduced very much. By contrast, in the apparatus 1 (FIG. 9), the deep-ultraviolet laser beam has a reflection loss of about 22% as it emerges from the input/output plane S3 of the nonlinear optical element 101. Thus, the modified laser beam-generating apparatus can obtain an extremely high conversion efficiency.

Moreover, the deep-ultraviolet laser beam reflected by the input/output plane S3 may be positively utilized as a light in the output monitor for the laser beam-generating apparatus 1, not decreasing the reflection loss of the deep-ultraviolet laser beam at the input/output plane S3 as has been indicated earlier. More precisely, a photodetector may be provided on the axis of the deep-ultraviolet laser beam reflected from the input/output plane S3 of the nonlinear optical element 101. In this case, the photodetector detects the intensity of the deep-ultraviolet laser beam reflected from the input/output plane S3, and the apparatus 1 is controlled to render the intensity of the deep-ultraviolet laser beam constant. The laser beam-generating apparatus 1 can operate more stably than otherwise.

If the deep-ultraviolet laser beam reflected by the input/output plane S3 is utilized as a light in the output monitor, it is desired that the sides of the nonlinear optical element 101 be left unpolished. In other words, the sides of the element 101 should remain in sand-blasted state. Then, the sides of the element 101 can function as diffusion panels, diffusing the deep-ultraviolet laser beam. The light beam of the ultraviolet region can be uniformly applied to the light-receiving surface of the photodetector. Since the ultraviolet beam is not focused at a limited part of the light-receiving surface of the photodetector, it would not lower the sensitivity of the photodetector.

In some cases it may be necessary to monitor the intensity of the green laser beam applied to the deep-ultraviolet laser beam-generating section 20. Then, the green laser beam traveling as an extraordinary ray in the nonlinear optical element 101 can be utilized as will be explained. When the green laser beam enters the nonlinear optical element 101, it has a component, though small, which will become an extraordinary ray. This component amount is only about 0.15% of the green laser beam if the nonlinear optical element 101 has an apex angle $\alpha 0$ of 88.5° as mentioned above. Nevertheless, it travels as an extraordinary ray in the nonlinear optical element 101 along almost the same path as the deep-ultraviolet laser beam, and emerges from the element 101, at almost the same position as the deep-ultraviolet laser beam. The component of the green laser beam emerges from the input/output plane S3 in a direction different from the direction in which the deep-ultraviolet laser beam is emitted from the plane S3. This is because the component, which travels as an extraordinary ray in the element 101, is refracted less than the deep-ultraviolet laser beam. Thus, a photodetector may be arranged on the path of the green laser beam emitter from the element 101 in a direction different from the direction in which the deep-ultraviolet laser beam is emitted from the element 101. The photodetector may then detect the intensity of the green laser beam. In other words, it can monitor the intensity of the green laser beam applied as fundamental wave to the deep-ultraviolet laser beam-generating section 20.

FM side-band method may be employed to detect an error signal that adjusts the resonance length of the optical resonator 100. If so, the signal output from the photodetector 25 is not used as the error signal. Rather, use is made of the signal the photodetector generates as it detects the intensity of the green laser beam that has traveled in the nonlinear optical element 101 and emitted therefrom in a direction different from the direction in which the deep-ultraviolet laser beam is emitted therefrom. The control circuit 26 uses the modulated signal, thus performing synchronous detection on the signal generated by this photodetector, thereby to detect an error signal that represents the phase difference between the beams traveling along the optical paths in the optical resonator 100.

The nonlinear optical element 101 described above has two internal total reflection planes S1 and S2. An nonlinear optical element having three or more internal total reflection planes may be used instead. In this case, too, the axis of the green laser beam applied into the nonlinear optical element and the axis of the green laser beam emitted from the element need to intersect with each other, at a position outside the nonlinear optical element. Further, the nonlinear optical element needs to be shaped to emit the deep-ultraviolet laser beam, well deviated from the green laser beam emitted from the nonlinear optical element.

Thus far described is the laser beam-generating apparatus 1 that is designed to generate a deep-ultraviolet laser beam having the wavelength of 266 nm. The present invention is not limited to the apparatus 1. It can be applied to any laser beam-generating apparatus that has a nonlinear optical element configured to perform wavelength conversion on an input beam and that generates a laser beam having a prescribed wavelength.

What is claimed is:

1. A laser beam-generating apparatus comprising:

wave-generating means for generating a fundamental wave;

a nonlinear optical element for receiving the fundamental wave generated by the wave-generating means and allowing the fundamental wave to pass along an optical path satisfying conditions for phase matching, and generate a harmonic wave, said nonlinear optical element having a plurality of internal total reflection planes and being configured to emit the fundamental wave sequentially reflected at the internal total reflection planes, in a direction intersecting with an axis of the fundamental wave applied to the nonlinear optical element and to emit the harmonic wave sequentially reflected at the internal total reflection planes, spatially deviated from the fundamental wave, by utilizing birefringence in the nonlinear optical element and internal total reflections at the internal total reflection planes;

wave-reflecting means provided at an intersection of the axis of the fundamental wave applied to the nonlinear optical element and an axis of the fundamental wave emitted from the nonlinear optical element, for reflecting the fundamental wave emitted from the nonlinear optical element and applying the same again into the nonlinear optical element; and harmonic-reflecting means for reflecting the harmonic wave emitted from the nonlinear optical element and spatially deviated from the fundamental wave, thereby to emit the harmonic wave from the laser beam-generating apparatus.

2. The laser beam-generating apparatus according to claim 1, wherein the harmonic wave is a continuous deep-ultraviolet laser beam.

3. The laser beam-generating apparatus according to claim 1, wherein the nonlinear optical element comprises a BBO crystal.

4. The laser beam-generating apparatus according to claim 1, wherein the nonlinear optical element has a plane to which the fundamental wave is applied and which is inclined at almost a Brewster angle to the axis of the fundamental wave applied into the nonlinear optical element.

\* \* \* \* \*